US012718637B2

(12) United States Patent
Pham et al.

(10) Patent No.: US 12,718,637 B2

(45) Date of Patent: Aug. 25, 2026

(54) VEHICLE DIAGNOSTIC METHOD BASED ON MODE $06 AND IN-USE MONITOR PERFORMANCE RATIO DATA

(71) Applicant: Innova Electronics Corporation, Irvine, CA (US)

(72) Inventors: Phuong Pham, Fountain Valley, CA (US); Keith Andreasen, Garden Grove, CA (US); Danh Nguyen, Ho Chi Minh City (VN); Thuan Huynh, Ho Chi Minh City (VN); Ly Bach, Ho Chi Minh City (VN)

(73) Assignee: Innova Electronics Corporation, Irvine, CA (US)

(*) Notice: Subject to any disclaimer, the term of this patent is extended or adjusted under 35 U.S.C. 154(b) by 105 days.

(21) Appl. No.: 18/734,370

(22) Filed: Jun. 5, 2024

(65) Prior Publication Data

US 2025/0378722 A1 Dec. 11, 2025

(51) Int. Cl.
*G07C 5/08* (2006.01)
*G07C 5/00* (2006.01)

(52) U.S. Cl.
CPC ........... *G07C 5/0816* (2013.01); *G07C 5/008* (2013.01); *G07C 5/0808* (2013.01); *G07C 5/085* (2013.01)

(58) Field of Classification Search
None
See application file for complete search history.

(56) References Cited

U.S. PATENT DOCUMENTS 11,113,902 B2 9/2021 Pham et al.
2006/0089767 A1* 4/2006 Sowa .................... G01M 15/05 701/1
2008/0012725 A1* 1/2008 Zoladek ................. G07C 5/008 340/870.07

(Continued)

FOREIGN PATENT DOCUMENTS

CN 113263993 A * 8/2021 ......... B60R 16/0232
KR 20210002264 A * 1/2021 ............. G01R 33/07

OTHER PUBLICATIONS

Machine translation of KR-20210002264-A (Year: 2021).*

(Continued)

*Primary Examiner* — Anne Marie Antonucci
*Assistant Examiner* — Kyle S Park
(74) *Attorney, Agent, or Firm* — Stetina Garred Brucker & Newboles

(57) ABSTRACT

An automotive diagnostic method aimed at focusing diagnostic data retrieval and analysis on a possible fault condition includes receiving vehicle data from a vehicle at a data acquisition and transfer device (DAT) and analyzing the vehicle data to identify a possible fault condition. A drive cycle associated with the identified possible fault condition is identified, and driving conditions are monitored to identify completion of the identified drive cycle. Upon completion of the identified drive cycle, vehicle data is analyzed to identify an abnormal monitor. Vehicle data is also analyzed to identify an abnormal value of In-Use Monitor Performance Ratio (IUMPR) associated with the abnormal monitor. When an abnormal value of IUMPR is identified, a likely diagnostic condition associated with the identified abnormal IUMPR is further identified.

22 Claims, 13 Drawing Sheets

(56) References Cited

U.S. PATENT DOCUMENTS

| | | | | |
|---|---|---|---|---|
| 2012/0072060 | A1* | 3/2012 | Zettel | B60W 20/50 903/902 |
| 2018/0257683 | A1* | 9/2018 | Govindappa | B61L 27/57 |
| 2019/0304213 | A1* | 10/2019 | Chen | G07C 5/0833 |
| 2021/0375076 | A1* | 12/2021 | Scotland | G07C 5/0825 |
| 2023/0282033 | A1* | 9/2023 | Duan | G07C 5/006 701/29.6 |
| 2024/0047982 | A1* | 2/2024 | Green | B60R 16/033 |

OTHER PUBLICATIONS

Meier, Peter F. "Mode $06: A Tech's Perspective.", Nov. 2006, Motor Age, vol. 125(11), p. 111-116 (Year: 2006).*
Machine translation of CN-113263993-A (Year: 2021).*

* cited by examiner

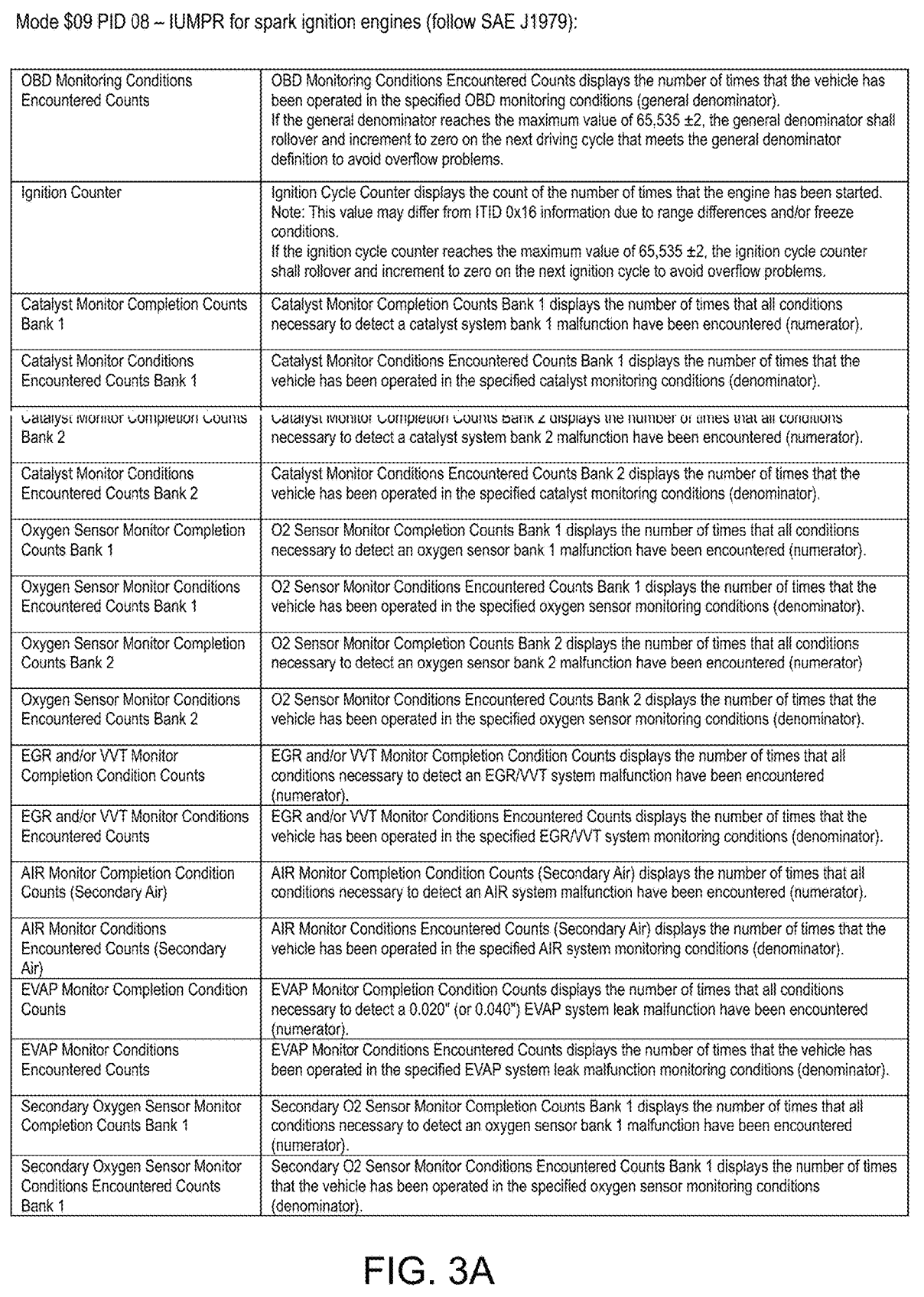

Mode $09 PID 08 – IUMPR for spark ignition engines (follow SAE J1979):

| | |
|---|---|
| OBD Monitoring Conditions Encountered Counts | OBD Monitoring Conditions Encountered Counts displays the number of times that the vehicle has been operated in the specified OBD monitoring conditions (general denominator).<br>If the general denominator reaches the maximum value of 65,535 ±2, the general denominator shall rollover and increment to zero on the next driving cycle that meets the general denominator definition to avoid overflow problems. |
| Ignition Counter | Ignition Cycle Counter displays the count of the number of times that the engine has been started.<br>Note: This value may differ from ITID 0x16 information due to range differences and/or freeze conditions.<br>If the ignition cycle counter reaches the maximum value of 65,535 ±2, the ignition cycle counter shall rollover and increment to zero on the next ignition cycle to avoid overflow problems. |
| Catalyst Monitor Completion Counts Bank 1 | Catalyst Monitor Completion Counts Bank 1 displays the number of times that all conditions necessary to detect a catalyst system bank 1 malfunction have been encountered (numerator). |
| Catalyst Monitor Conditions Encountered Counts Bank 1 | Catalyst Monitor Conditions Encountered Counts Bank 1 displays the number of times that the vehicle has been operated in the specified catalyst monitoring conditions (denominator). |
| Catalyst Monitor Completion Counts Bank 2 | Catalyst Monitor Completion Counts Bank 2 displays the number of times that all conditions necessary to detect a catalyst system bank 2 malfunction have been encountered (numerator). |
| Catalyst Monitor Conditions Encountered Counts Bank 2 | Catalyst Monitor Conditions Encountered Counts Bank 2 displays the number of times that the vehicle has been operated in the specified catalyst monitoring conditions (denominator). |
| Oxygen Sensor Monitor Completion Counts Bank 1 | O2 Sensor Monitor Completion Counts Bank 1 displays the number of times that all conditions necessary to detect an oxygen sensor bank 1 malfunction have been encountered (numerator). |
| Oxygen Sensor Monitor Conditions Encountered Counts Bank 1 | O2 Sensor Monitor Conditions Encountered Counts Bank 1 displays the number of times that the vehicle has been operated in the specified oxygen sensor monitoring conditions (denominator). |
| Oxygen Sensor Monitor Completion Counts Bank 2 | O2 Sensor Monitor Completion Counts Bank 2 displays the number of times that all conditions necessary to detect an oxygen sensor bank 2 malfunction have been encountered (numerator) |
| Oxygen Sensor Monitor Conditions Encountered Counts Bank 2 | O2 Sensor Monitor Conditions Encountered Counts Bank 2 displays the number of times that the vehicle has been operated in the specified oxygen sensor monitoring conditions (denominator). |
| EGR and/or VVT Monitor Completion Condition Counts | EGR and/or VVT Monitor Completion Condition Counts displays the number of times that all conditions necessary to detect an EGR/VVT system malfunction have been encountered (numerator). |
| EGR and/or VVT Monitor Conditions Encountered Counts | EGR and/or VVT Monitor Conditions Encountered Counts displays the number of times that the vehicle has been operated in the specified EGR/VVT system monitoring conditions (denominator). |
| AIR Monitor Completion Condition Counts (Secondary Air) | AIR Monitor Completion Condition Counts (Secondary Air) displays the number of times that all conditions necessary to detect an AIR system malfunction have been encountered (numerator). |
| AIR Monitor Conditions Encountered Counts (Secondary Air) | AIR Monitor Conditions Encountered Counts (Secondary Air) displays the number of times that the vehicle has been operated in the specified AIR system monitoring conditions (denominator). |
| EVAP Monitor Completion Condition Counts | EVAP Monitor Completion Condition Counts displays the number of times that all conditions necessary to detect a 0.020" (or 0.040") EVAP system leak malfunction have been encountered (numerator). |
| EVAP Monitor Conditions Encountered Counts | EVAP Monitor Conditions Encountered Counts displays the number of times that the vehicle has been operated in the specified EVAP system leak malfunction monitoring conditions (denominator). |
| Secondary Oxygen Sensor Monitor Completion Counts Bank 1 | Secondary O2 Sensor Monitor Completion Counts Bank 1 displays the number of times that all conditions necessary to detect an oxygen sensor bank 1 malfunction have been encountered (numerator). |
| Secondary Oxygen Sensor Monitor Conditions Encountered Counts Bank 1 | Secondary O2 Sensor Monitor Conditions Encountered Counts Bank 1 displays the number of times that the vehicle has been operated in the specified oxygen sensor monitoring conditions (denominator). |

FIG. 3A

| | |
|---|---|
| Secondary Oxygen Sensor Monitor Completion Counts Bank 2 | Secondary O2 Sensor Monitor Completion Counts Bank 2 displays the number of times that all conditions necessary to detect an oxygen sensor bank 2 malfunction have been encountered (numerator) |
| Secondary Oxygen Sensor Monitor Conditions Encountered Counts Bank 2 | Secondary O2 Sensor Monitor Conditions Encountered Counts Bank 2 displays the number of times that the vehicle has been operated in the specified oxygen sensor monitoring conditions (denominator). |
| Air Fuel Ratio Imbalance Monitor Completion Counts Bank 1 | Air Fuel Ratio Imbalance Monitor Completion Counts Bank 1 displays the number of times that all conditions necessary to detect an AFRI bank 1 malfunction have been encountered (numerator). |
| Air Fuel Ratio Imbalance Monitor Conditions Encountered Counts Bank 1 | Air Fuel Ratio Imbalance Monitor Conditions Encountered Counts Bank 1 displays the number of times that the vehicle has been operated in the specified AFRI monitoring conditions (denominator). |
| Air Fuel Ratio Imbalance Monitor Completion Counts Bank 2 | Air Fuel Ratio Imbalance Monitor Completion Counts Bank 2 displays the number of times that all conditions necessary to detect an AFRI bank 1 malfunction have been encountered (numerator). |
| Air Fuel Ratio Imbalance Monitor Conditions Encountered Counts Bank 2 | Air Fuel Ratio Imbalance Monitor Conditions Encountered Counts Bank 2 displays the number of times that the vehicle has been operated in the specified AFRI monitoring conditions (denominator). |
| Particulate Filter Monitor Completion Counts Bank 1 | Particulate Filter Monitor Completion Counts Bank 1 displays the number of times that all conditions necessary to detect a PF Bank 1 malfunction have been encountered (numerator). |
| Particulate Filter Monitor Conditions Encountered Counts Bank 1 | Particulate Filter Monitor Conditions Encountered Counts Bank 1 displays the number of times that the vehicle has been operated in the specified PF monitoring conditions (denominator). |
| Particulate Filter Monitor Completion Counts Bank 2 | Particulate Filter Monitor Completion Counts Bank 2 displays the number of times that all conditions necessary to detect an PF Bank 2 malfunction have been encountered (numerator). |
| Particulate Filter Monitor Conditions Encountered Counts Bank 2 | Particulate Filter Monitor Conditions Encountered Counts Bank 2 displays the number of times that the vehicle has been operated in the specified PF monitoring conditions (denominator). |

FIG. 3B

Mode $09 PID 0B – IUMPR for compression ignition engines (follow SAE J1979):

| | |
|---|---|
| OBD Monitoring Conditions Encountered Counts | OBD Monitoring Conditions Encountered Counts displays the number of times that the vehicle has been operated in the specified OBD monitoring conditions (general denominator).<br>If the general denominator reaches the maximum value of 65,535 ±2, the general denominator shall rollover and increment to zero on the next driving cycle that meets the general denominator definition to avoid overflow problems. |
| Ignition Cycle Counter | Ignition Cycle Counter displays the count of the number of times that the engine has been started.<br>Note: This value may differ from ITID 0x16 information due to range differences and/or freeze conditions.<br>If the ignition cycle counter reaches the maximum value of 65,535 ±2, the ignition cycle counter shall rollover and increment to zero on the next ignition cycle to avoid overflow problems. |
| NMHC Catalyst Monitor Completion Counts | NMHC Catalyst Monitor Completion Counts displays the number of times that all conditions necessary to detect an NMHC catalyst system malfunction have been encountered (numerator). |
| NMHC Catalyst Monitor Conditions Encountered Counts | NMHC Catalyst Monitor Conditions Encountered Counts displays the number of times that the vehicle has been operated in the specified NMHC catalyst monitoring conditions (denominator). |
| NOx/SCR Catalyst Monitor Completion Condition Counts | NOx Catalyst Monitor Completion Counts displays the number of times that all conditions necessary to detect a NOx catalyst system malfunction have been encountered (numerator). |
| NOx/SCR Catalyst Monitor Conditions Encountered Counts | NOx Catalyst Monitor Conditions Encountered Counts displays the number of times that the vehicle has been operated in the specified NOx catalyst monitoring conditions (denominator). |
| NOx Adsorber Monitor Completion Condition Counts | NOx Adsorber Monitor Completion Counts displays the number of times that all conditions necessary to detect a NOx adsorber system malfunction have been encountered (numerator). |
| NOx Adsorber Monitor Conditions Encountered Counts | NOx Adsorber Monitor Conditions Encountered Counts displays the number of times that the vehicle has been operated in the specified NOx adsorber monitoring conditions denominator). |
| PM Filter Monitor Completion Condition Counts | PM Filter Monitor Completion Counts displays the number of times that all conditions necessary to detect a PM filter system malfunction have been encountered (numerator).<br>Note: If a commanded DPF regen (Service $08, TID $02) causes the PM filter monitor to complete and make a monitoring decision equivalent to one that would be made by the normal on board PM filter monitor, the numerator may be incremented after the PM filter monitor completes. |
| PM Filter Monitor Conditions Encountered Counts | PM Filter Monitor Conditions Encountered Counts displays the number of times that the vehicle has been operated in the specified PM filter monitoring conditions denominator). |
| Exhaust Gas Sensor Monitor Completion Counts | Exhaust Gas Sensor Monitor Completion Counts displays the number of times that all conditions necessary to detect an exhaust gas sensor malfunction have been encountered (numerator) |
| Exhaust Gas Sensor Monitor Conditions Encountered Counts | Exhaust Gas Sensor Monitor Conditions Encountered Counts displays the number of times that the vehicle has been operated in the specified exhaust gas sensor monitoring conditions (denominator). |
| EGR and/or VVT Monitor Completion Condition Counts | EGR and/or VVT Monitor Completion Condition Counts displays the number of times that all conditions necessary to detect an EGR/VVT system malfunction have been encountered (numerator). |
| EGR and/or VVT Monitor Conditions Encountered Counts | EGR and/or VVT Monitor Conditions Encountered Counts displays the number of times that the vehicle has been operated in the specified EGR/VVT system monitoring conditions (denominator). |
| Boost Pressure Monitor Completion Condition Counts | Boost Pressure Monitor Completion Condition Counts displays the number of times that all conditions necessary to detect a boost pressure system malfunction have been encountered (numerator). |
| Boost Pressure Monitor Conditions Encountered Counts | Boost Pressure Monitor Conditions Encountered Counts displays the number of times that the vehicle has been operated in the specified boost pressure system monitoring conditions (denominator). |
| Fuel Monitor Completion Condition Counts | Fuel System Monitor Completion Condition Counts displays the number of times that all conditions necessary to detect a fuel system malfunction have been encountered (numerator). |
| Fuel Monitor Conditions Encountered Counts | Fuel System Monitor Conditions Encountered Counts displays the number of times that the vehicle has been operated in the specified fuel system monitoring conditions (denominator). |

FIG. 4

| PID (Hex) | Description | Data Byte | Scaling/Bit | External test equipment SI (Metric) / English display |
|---|---|---|---|---|
| 41 | **Enable status of continuous monitors this monitoring cycle** | **B (bit)** | **Byte 2 of 4 (Low Nibble)** | **Enable status of continuous monitors this monitoring cycle: NO means disabled for rest of this monitoring cycle or not supported in PID $01, YES means enabled for this monitoring cycle.** |
| | Misfire monitoring | 0 | 0 = monitor disabled for rest of this monitoring cycle or not supported (NO)<br>1 = monitor enabled for this monitoring cycle (YES) | MIS_ENA: NO or YES |
| | Fuel system monitoring | 1 | | FUEL_ENA : NO or YES |
| | Comprehensive component monitoring | 2 | | CCM_ENA : NO or YES |
| | **Completion status of continuous monitors this monitoring cycle:** | **B (bit)** | **Byte 2 of 4 (High Nibble)** | **Completion status of continuous monitors this monitoring cycle** |
| | Misfire monitoring | 4 | 0 = monitor complete this monitoring cycle, or not supported (YES)<br>1 = monitor not complete this monitoring cycle (NO) | MIS_CMPL : YES or NO |
| | Fuel system monitoring | 5 | | FUE_CMPL : YES or NO |
| | Comprehensive component monitoring | 6 | | CCM_CMPL : YES or NO |

FIG. 5

| PID (Hex) | Description | Data Byte | Scaling/Bit | External test equipment SI (Metric) / English display |
|---|---|---|---|---|
| 41 | **Enable status of non-continuous monitors this monitoring cycle** | **C (bit)** | **Byte 3 of 4** | **Enable status of non-continuous monitors this monitoring cycle** |
| | Catalyst monitoring | 0 | 0 =monitor disabled for rest of this monitoring cycle (NO)<br>1 =monitor enabled for this monitoring cycle (YES) | CAT_ENA: NO or YES |
| | Heated catalyst monitoring | 1 | | HCAT_ ENA: NO or YES |
| | Evaporative system monitoring | 2 | | EVAP_ ENA: NO or YES |
| | Secondary air system monitoring | 3 | | AIR_ ENA: NO or YES |
| | A/C system refrigerant monitoring | 4 | | ACRF_ ENA: NO or YES |
| | Oxygen sensor monitoring | 5 | | O2S_ ENA: NO or YES |
| | Oxygen sensor heater monitoring | 6 | | HTR_ ENA: NO or YES |
| | EGR system monitoring | 7 | | EGR_ ENA: NO or YES |
| | **Completion status of non-continuous monitors this monitoring cycle:** | **D (bit)** | **Byte 3 of 4** | **Completion status of non-continuous monitors this monitoring cycle** |
| | Catalyst monitoring | 0 | 0 = monitor disabled for rest of this monitoring cycle (NO)<br>1 =monitor enabled for this monitoring cycle (YES) | CAT_CMPL: YES or NO |
| | Heated catalyst monitoring | 1 | | HCAT_CMPL: YES or NO |
| | Evaporative system monitoring | 2 | | EVAP_CMPL: YES or NO |
| | Secondary air system monitoring | 3 | | AIR_CMPL: YES or NO |
| | A/C system refrigerant monitoring | 4 | | ACRF_CMPL: YES or NO |
| | Oxygen sensor monitoring | 5 | | O2S_CMPL: YES or NO |
| | Oxygen sensor heater monitoring | 6 | | HTR_CMPL: YES or NO |
| | EGR system monitoring | 7 | | EGR_CMPL: YES or NO |

FIG. 6

In-use performance tracking for spark ignition engines(IUPR)

| | | |
|---|---|---|
| OBD monitoring conditions encountered counts | 7510 | counts |
| Ignition counter | 15211 | counts |
| Catalyst monitor completion counts bank 1 | 11017 | counts |
| Catalyst monitor conditions encountered counts bank 1 | 7507 | counts |
| Catalyst bank 1 IUPR ratio | 1.468 | |
| Catalyst monitor completion counts bank 2 | 0 | counts |
| Catalyst monitor conditions encountered counts bank 2 | 0 | counts |
| Catalyst bank 2 IUPR ratio | ----- | |
| O2 sensor monitor completion counts bank 1 | 9136 | counts |
| O2 sensor monitor condition encountered counts bank 1 | 7507 | counts |
| O2 sensor bank 1 IUPR ratio | 1.217 | |
| O2 sensor monitor completion counts bank 2 | 0 | counts |
| O2 sensor monitor condition encountered counts bank 2 | 0 | counts |
| O2 sensor bank 2 IUPR ratio | ----- | |
| EGR and/or VVT monitor completion condition counts | 6744 | counts |
| EGR and/or VVT monitor conditions encountered counts | 7509 | counts |
| EGR and/or VVT IUPR ratio | 0.898 | |
| Air monitor completion condition counts(secondary air) | 0 | counts |
| Air monitor conditions encountered counts(secondary air) | 0 | counts |
| Secondary air IUPR ratio | ----- | |
| EVAP monitor completion condition counts | 1347 | counts |
| EVAP monitor conditions encountered counts | 3712 | counts |
| EVAP IUPR ratio | 0.363 | |
| Secondary O2 sensor monitor completion counts bank 1 | 8926 | counts |
| Secondary O2 sensor monitor conditions encountered counts bank 1 | 7507 | counts |
| Secondary O2 sensor bank 1 IUPR ratio | 1.189 | |
| Secondary O2 sensor monitor completion counts bank 2 | 0 | counts |
| Secondary O2 sensor monitor conditions encountered counts bank 2 | 0 | counts |
| Secondary O2 sensor bank 2 IUPR ratio | ----- | |

FIG. 8

| Description | MID | TID | Min | Max | Value | Unit | Result |
|---|---|---|---|---|---|---|---|
| A/F sensor (bank 1) | 01 | | | | | | |
| Check of A/F sensor 'non-activation' time. See test ID $81 and $82 for 'non-activation' criteria | 01 | 80 | 00:00:00 | 00:00:40 | 00:00:11 | h:m:s | OK |
| Check of A/F sensor 'non-activation' by monitoring the sensor element resis-tance during A/F feedback control. | 01 | 87 | 0.000 | 0.192 | 0.272 | kOhm | Failed |
| Check of the A/F sensor 'too lean' by monitoring the A/F sensor signal | 01 | 83 | -1.230 | 127.996 | 0.059 | mA | OK |
| Check of A/F sensor rationality by monitoring the sensor signal during fuel cutcondition. | 01 | 84 | -2.172 | -0.500 | -1.652 | mA | OK |
| Check of A/F sensor 'out of range' by monitoring the sensor signal. | 01 | 86 | -2.254 | 127.996 | 0.008 | mA | OK |
| $ 01 89 | 01 | 89 | 133 | 65535 | 1223 | | OK |
| Secondary HO2S(bank 1) | 02 | | | | | | |
| Response check of secondary heated oxygen sensor by monitoring the sensor output voltage during fuel cut condition. | 02 | 9D | 0.000 | 0.322 | 0.043 | V | OK |
| $ 02 9E | 02 | 9E | 0.050 | 65.535 | 0.559 | V | OK |
| Catalyst (bank 1) | 21 | | | | | | |
| Catalyst capability, monitored by measuring the stability of the secondary heated oxygen sensor output value. | 21 | A1 | 0.000 | 3.000 | 0.000 | V | OK |
| EGR system | 31 | | | | | | |

FIG. 9

VEHICLE DIAGNOSTIC METHOD BASED ON MODE $06 AND IN-USE MONITOR PERFORMANCE RATIO DATA

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to a vehicle diagnostic system and method, and in particular, a vehicle diagnostic system and method aimed at identifying an underlying diagnostic issue that caused the triggering of a diagnostic fault code.

2. Description of the Related Art

The integration of computer systems into the automobile has resulted in automotive diagnostics including a data analysis component. In this regard, while historical vehicle diagnostics may have relied solely on a mechanic's assessment of what can be seen or heard during operation of the vehicle, the data provided by the contemporary vehicles allows for a much more comprehensive diagnostic assessment of the vehicle.

However, as vehicles evolve and more computers become integrated into the vehicle, using data to diagnose a vehicle may require a nuanced approach. For instance, diagnostic trouble codes (DTCs) are generated by contemporary vehicles when a problem has arisen in one or more components of the vehicle. Retrieving and reviewing the DTC(s) is certainly a useful part of a diagnostic process, particularly when the process is supported by historical data for vehicle specific resolution. However, relying solely on the DTC(s) may lead to ambiguous results, as the DTC(s) may be representative of a symptom based on an underlying, deeper diagnostic condition.

In addition to DTC(s), many modern vehicles may also be capable of generating live data for one or more sensors, systems, or other vehicle components. The live data may be representative of that vehicle component's performance during operation of the vehicle, and thus, the use of live data may be a useful tool when trying to diagnose a vehicle.

The large amounts of data that may be generated by the vehicle may lead to accurate, data-based diagnostic conclusions. However, undertaking the task of analyzing the vehicle data may be beyond the capabilities or interest of the common vehicle owner, and thus, in many instances, problems with the vehicle may be ignored. For instance, live data may be difficult to decipher without a better understanding of the operative relationship between various components. Even professional mechanics may struggle at analyzing the vehicle data to troubleshooting problem. The ability to understand how one piece of diagnostic data may or may not relate to other pieces of diagnostic data may be challenging, and as a consequence, if related data goes unnoticed, it is possible that diagnostic insights or cues may be overlooked.

Furthermore, a diagnostic analysis of the vehicle may be enhanced by causing a prescribed action for one or more vehicle components, such as causing a valve to open or close. The prescribed action may be associated with an expected result, which may be observable in the live data. However, as noted above, being able to digest live data reading in the context of a comprehensive diagnostic data package may prove to be challenging.

Accordingly, there is a need in the art for a diagnostic system that provides an easy to use diagnostic system that may present diagnostic data in a easy to understand format, which may also facilitate processing of live data resulting from prescribed actions as part of a diagnostic assessment of the vehicle. Various aspects of the present disclosure address this particular need, as will be discussed in more detail below.

BRIEF SUMMARY

According to one embodiment, there is provided an automotive diagnostic method aimed at focusing diagnostic data retrieval and analysis on a possible fault condition. The method includes receiving vehicle data from a vehicle at a data acquisition and transfer device (DAT) and analyzing the vehicle data to identify a possible fault condition. A drive cycle associated with the identified possible fault condition is identified, and driving conditions are monitored to identify completion of the identified drive cycle. Upon completion of the identified drive cycle, vehicle data is analyzed to identify an abnormal monitor. Vehicle data is also analyzed to identify an abnormal value of In-Use Monitor Performance Ratio (IUMPR) associated with the abnormal monitor. When an abnormal value of IUMPR is identified, a likely diagnostic condition associated with the identified abnormal IUMPR is further identified.

When normal value of IUMPR may be identified, the method may additionally include the step of retrieving Mode $06 data. The Mode $06 data may be reviewed for an abnormal test result and the component associated with the abnormal test result may be identified. The method may also include step of initiating a Special Test for the component associated with the abnormal test result.

The step of analyzing vehicle data to identify a possible fault condition may be based on an analysis of at least one diagnostic trouble code (DTC) included in the received vehicle data.

The step of analyzing vehicle data to identify a possible fault condition may be based on an analysis of live data included in the received vehicle data.

The step of analyzing vehicle data to identify an abnormal value of IUMPR may include analyzing a conditions item portion of IUMPR. The step of analyzing vehicle data may occur at the DAT. The step of analyzing vehicle data to identify an abnormal value of IUMPR includes analyzing a completion item portion of IUMPR.

The step of analyzing vehicle data may include using a machine learning model, wherein vehicle data is entered into the machine learning model to produce the possible fault condition.

The method may additionally include the step of analyzing the received diagnostic data to identify at least one of a monitor ID and test ID when no abnormal IUMPR is identified.

The step of analyzing the vehicle data to identify a possible fault condition may occur at the DAT.

All steps following the receipt of vehicle data may occur autonomously in response to receipt of the vehicle data.

All steps following completion of the identified drive cycle may occur autonomously in response to identification of the completed drive cycle.

The method may also include the step of generating a signal for wireless communication to a remote electronic device, with the signal including the identified likely diagnostic condition.

The method may further comprise the step of assigning a reliability score to the possible fault condition. The steps of identifying the drive cycle and monitoring driving conditions may only occur if the reliability score is above a prescribed threshold.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIGS. 3A-3B are charts depicting exemplary monitors supported in Mode $09, PID 08 and PID OB-IUMPR for spark ignition engines;

FIG. 4 is a chart depicting exemplary monitors supported in Mode $09, PID 08 and PID OB-IUMPR for compression ignition engines;

FIG. 5 is a chart providing information related to continuous monitors that may run on a vehicle;

FIG. 6 is a chart providing information related to continuous monitors that may run on a vehicle;

FIG. 8-10 relate to an exemplary use of the present methodology.

Common reference numerals are used throughout the drawings and the detailed description to indicate the same elements.

DETAILED DESCRIPTION

The detailed description set forth below in connection with the appended drawings is intended as a description of certain embodiments of data-based vehicle diagnostics and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Various aspects of the present disclosure relate to an automotive diagnostic system and related methodology that analyzes vehicle data to derive a possible vehicle fix. When one or more Diagnostic Trouble Codes (DTCs) are triggered by the vehicle's electrical system, that is typically indicative of a problem in one or more vehicle components. A diagnostic tool may be used to retrieve the DTCs, as well as readiness monitors, Mode $06 monitors and In-Use Monitor Performance Ratio (IUMPR) counter data. The diagnostic method may check the Readiness Monitor status and then verify the test result via Mode $06 monitors and IUMPR counter data. A drive cycle may be added to this function to assist the user in driving the vehicle under the condition so that the Readiness Monitors can be completed. This verification step may allow for checking the status of the component in Mode $06 to detect if the component is good or not.

Figure 1A:
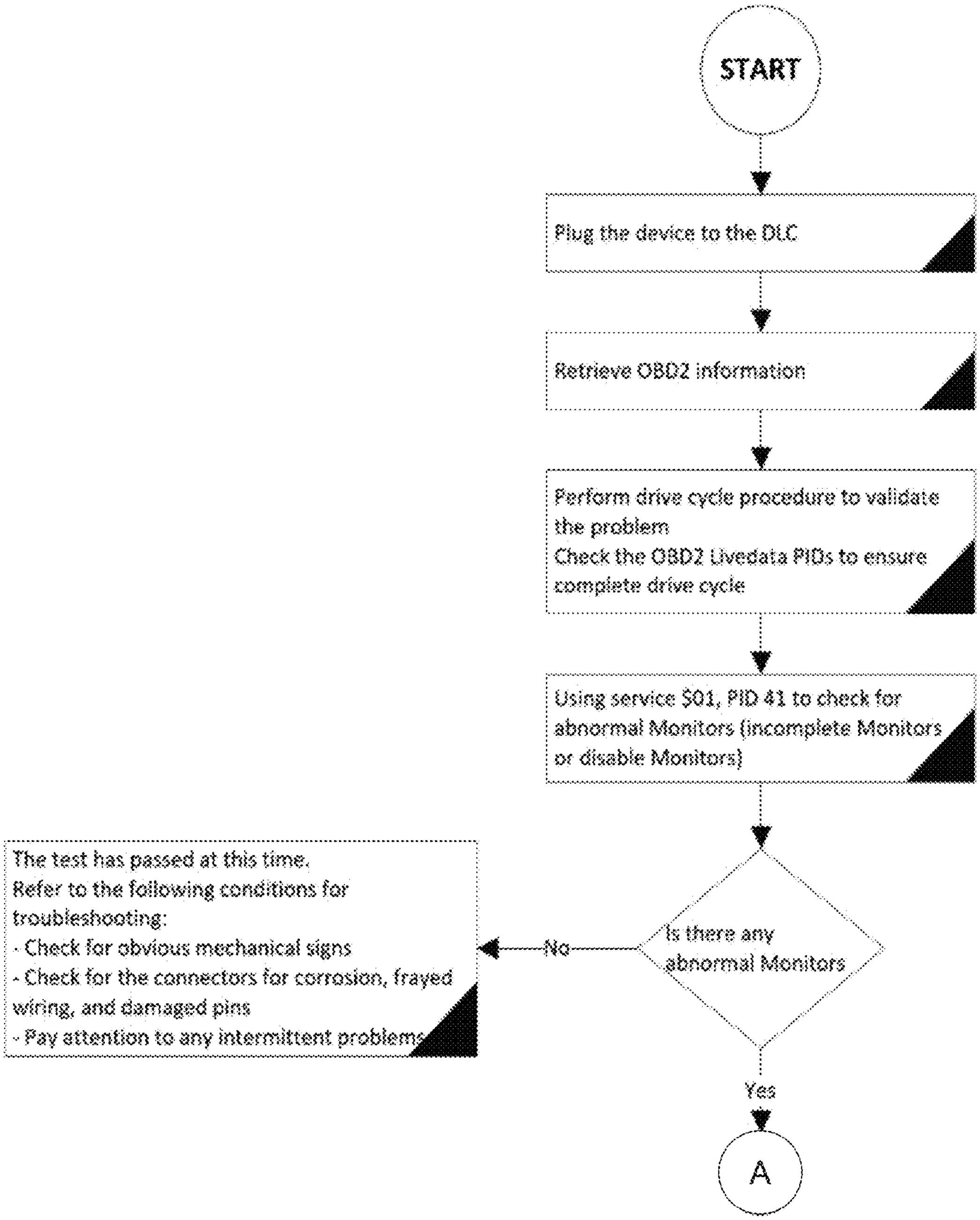
FIGS. 1A-1C depict a flow chart of one embodiment of a data driven vehicle diagnostic method.
Figure 1B:
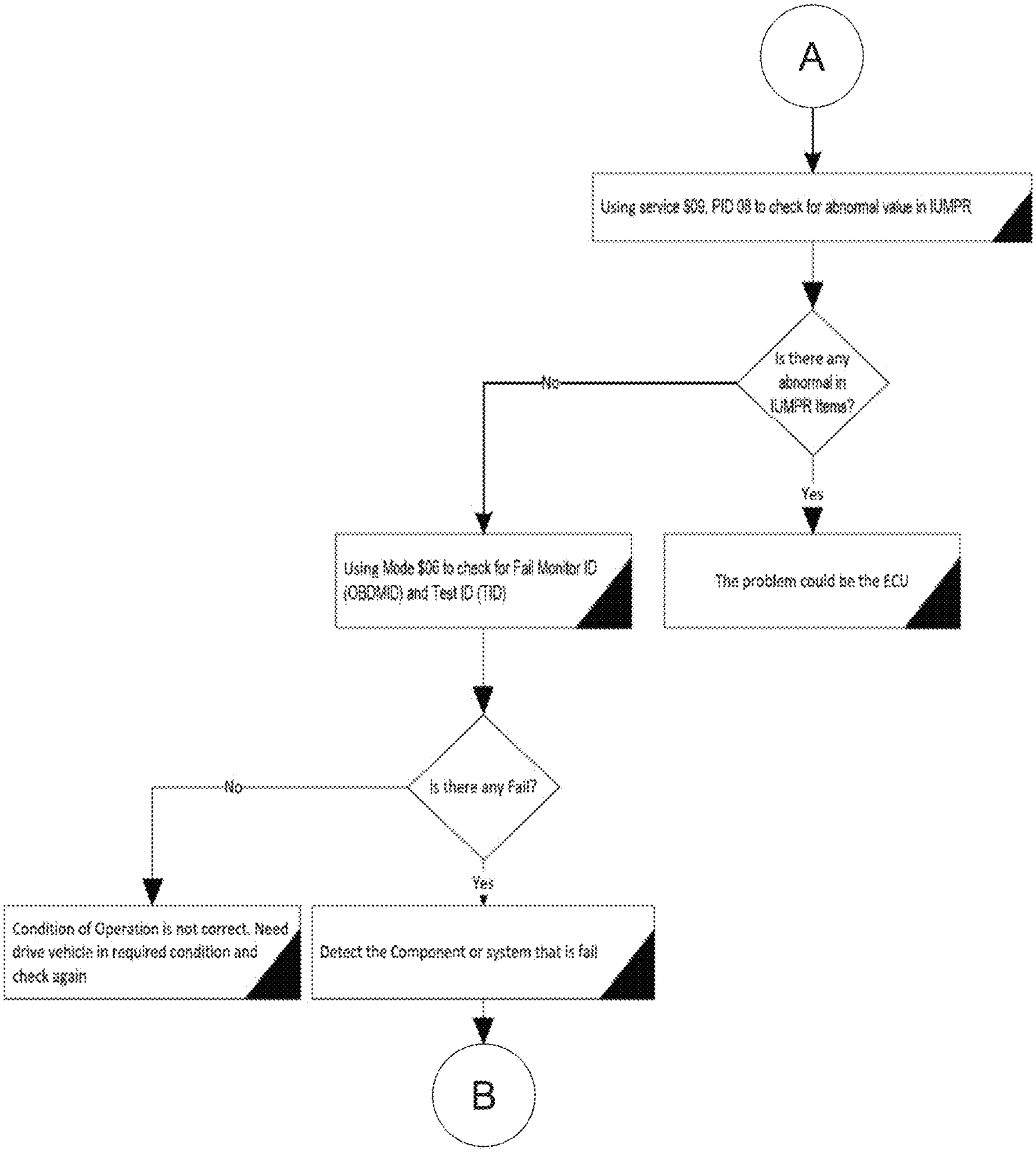
Figure 1C:
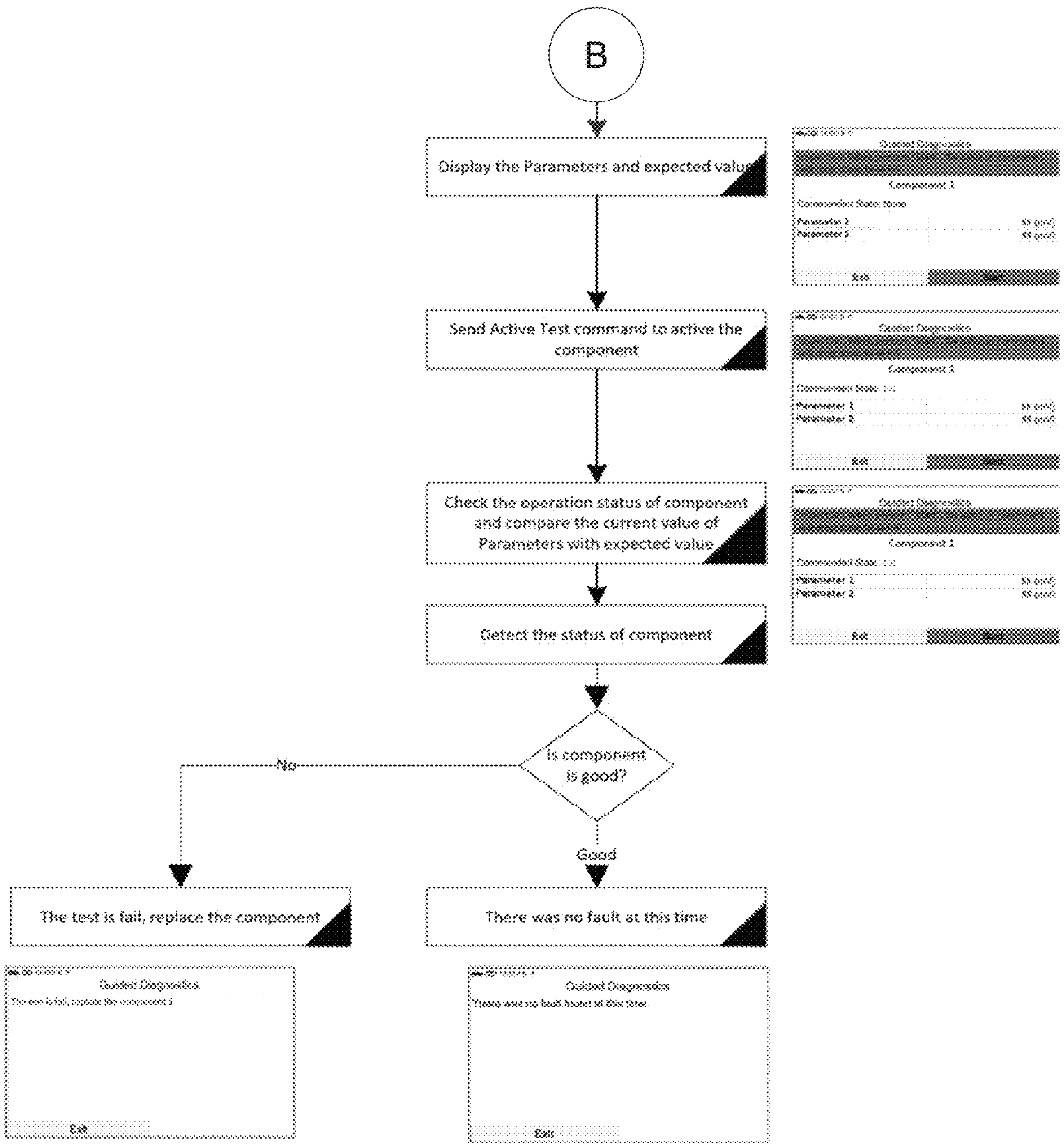
Figure 2:
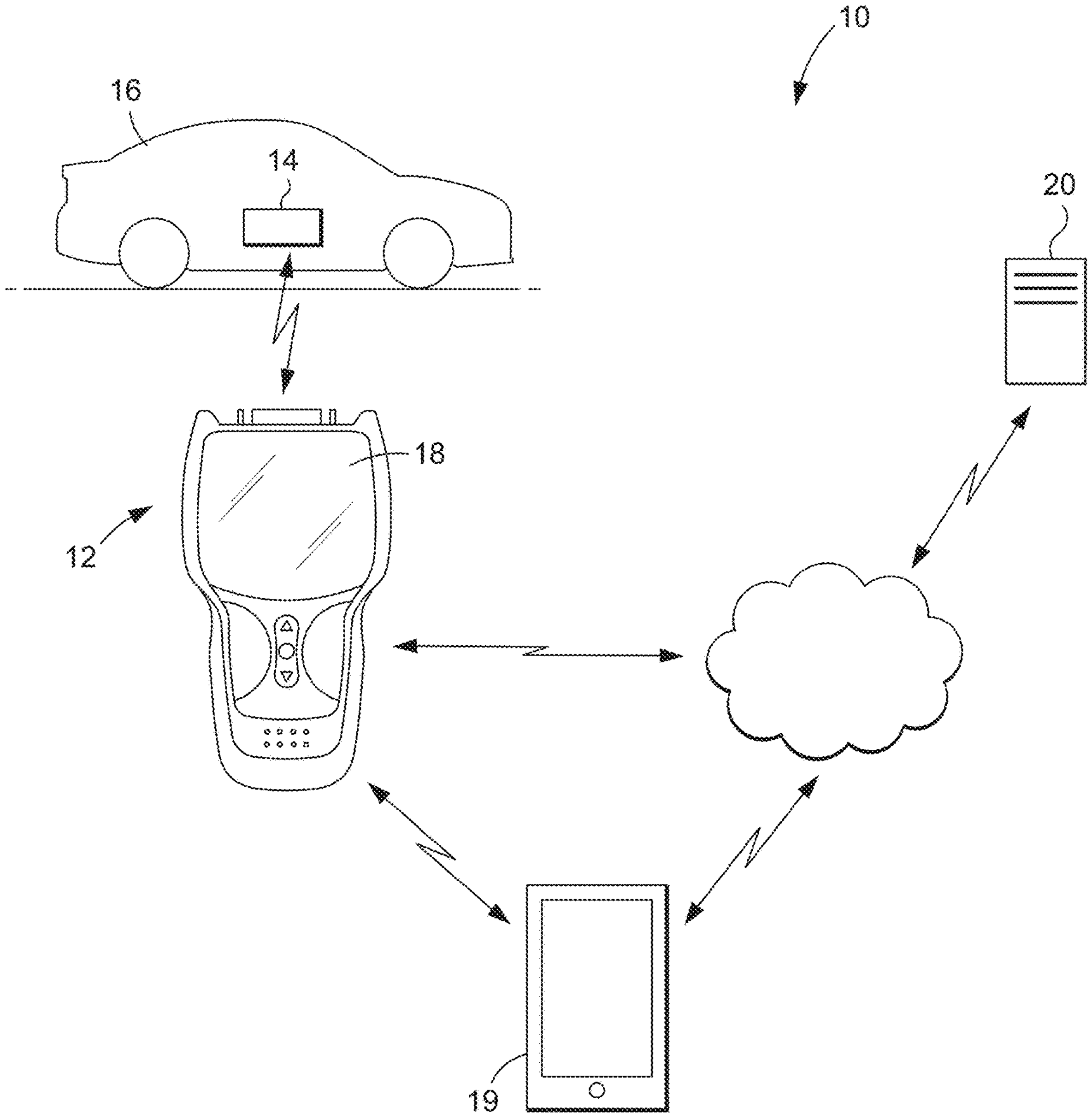
FIG. 2 is a schematic of a system configured to implement one embodiment of the data driven vehicle diagnostic method.

Referring now to FIGS. 1A-1C, there is depicted a flow chart of an exemplary vehicle diagnostic method, while FIG. 2 is a schematic overview of a system 10 associated with the vehicle diagnostic method. A data acquisition and transfer device (DAT) 12 is connectable to a data link connector (DLC) port 14 on a vehicle 16 to facilitate data communication between the vehicle 16 and the DAT 12. FIG. 1A describes the DAT 12 as being plugged into the DLC port 14, although it is contemplated that wireless communication between the DAT 12 and the vehicle 16 may also be employed without departing from the spirit and scope of the present disclosure.

As used herein, the term DAT 12 is broad enough to refer to a scan tool, code reader, dongle, or other electronic device (e.g., smartphone or tablet computer) capable of communicating with the vehicle. The DAT 12 may be sized to be hand-holdable by a user, and may include a connector port that may be connectable to the DLC port 14 on the vehicle 16. The data retrieved through the DLC port 14 may be live data, freeze frame data or stored data in the OBD-II format, or vehicle data formats that are currently in use or may be later developed. The DAT 12 may also have a local display 18 capable of displaying information related to operation of the DAT 12. The DAT 12 may also include a communication circuit capable of communicating data via short-range communications to nearby electronic devices, such as a user's smartphone 19, or via long-range communications to a remote device, such as a remote diagnostic server 20. The communication capabilities of the DAT 12 may include both wired communication as well as wireless communication, e.g., WI-FI, BLUETOOTH, cellular communication, or other wireless communication modalities known in the art.

The smartphone 19 or other computer in communication with the DAT 12 may include an application ("app.") downloadable thereon to facilitate desired operable compatibility and functionality in combination with the DAT 12. In this regard, the app. may include instructions executable by a processor (of the smartphone 19 or computer) to perform operations associated with the current diagnostic methodology.

The DAT 12 may send a request for OBD2 data to the vehicle 16, and may subsequently receive a data packet or data stream with the requested OBD2 data (e.g., vehicle data), which may include diagnostic data, as well as vehicle identification information (e.g., electronic VIN). The DAT 12 may include a local memory circuit to store data retrieved from the vehicle. The memory circuit may include flash memory, RAM (random-access memory) or other memory hardware known in the art.

The received OBD2 data may be analyzed to identify a possible fault condition or problem with the vehicle 16. The analysis of the OBD2 data may include an analysis of one or more diagnostic trouble codes, live data, freeze frame data, or other data included on the OBD2 data packet or otherwise acquired. The analysis of the OBD2 data may include a comparison of the received OBD2 data to historical OBD2 data of similar vehicles, with the historical data being matched to corresponding problems. The problem(s) associated with the historical data that most closely matches the received OBD2 data may be considered the most likely problem or fault condition. In other embodiments, algorithms or machine learning techniques may be used to identify the most likely problem or fault condition based on the received OBD2 data. For more information regarding the techniques that may be used in the analysis of vehicle data, please refer to the following U.S. patent documents, each of which is owned by Innova Electronics Corporation of Irvine, California: U.S. Pat. No. 6,807,469, entitled AUTO DIAGNOSTIC METHOD AND DEVICE, U.S. Pat. No. 6,925,368, entitled AUTO DIAGNOSTIC METHOD AND DEVICE, U.S. Pat. No. 7,620,484, entitled AUTOMOTIVE MOBILE DIAGNOSTICS, U.S. Pat. No. 8,068,951, entitled VEHICLE DIAGNOSTIC SYSTEM, U.S. Pat. No. 8,019,503, entitled AUTOMOTIVE DIAGNOSTIC AND REMEDIAL PROCESS, U.S. Pat. No. 8,370,018, entitled AUTOMOTIVE DIAGNOSTIC PROCESS, U.S. Pat. No. 8,909,416, entitled HANDHELD SCAN TOOL WITH FIXED SOLUTION CAPABILITY, U.S. Pat. No. 9,014,908, entitled MULTI-STAGE DIAGNOSTIC SYSTEM AND METHOD, U.S. Pat. No. 9,142,066, entitled MULTI-STAGE DIAGNOSTIC SYSTEM AND METHOD, U.S. Pat. No. 9,026,400, entitled DIAGNOSTIC PROCESS FOR HOME ELECTRONIC DEVICES, U.S. Pat. No. 9,177,428, entitled PREDICTIVE DIAGNOSTIC METHOD, U.S. Pat. No. 9,646,432, entitled HAND HELD DATA RETRIEVAL DEVICE WITH FIXED SOLUTION CAPABILITY, U.S. Pat. No. 9,824,507, entitled MOBILE DEVICE BASED VEHICLE DIAGNOSTIC SYSTEM, U.S. Pat. No. 10,643,403, entitled PREDICTIVE DIAGNOSTIC METHOD AND SYSTEM, U.S. Pat. No. 11,068,560, entitled METHOD OF PROCESSING VEHICLE DIAGNOSTIC DATA, U.S. Pat. No. 11,270,529, entitled SYSTEM AND METHOD FOR PROACTIVE VEHICLE DIAGNOSIS AND OPERATIONAL ALERT, U.S. Pat. No. 11,158,141, entitled SYSTEM AND METHOD FOR PROACTIVE VEHICLE DIAGNOSIS AND OPERATIONAL ALERT, U.S. Pat. No. 11,915,534, entitled VEHICLE DIAGNOSTICS WITH INTELLIGENT COMMUNICATION INTERFACE, the entire contents of each of which is expressly incorporated by reference herein.

It is contemplated that the identified possible fault condition may be assigned a reliability score or index indicative of a confidence associated with the possible fault condition. The reliability score may be a numerical value that quantifies a confidence in the diagnostic condition that is determined by the system and may be based on, for example, historical data indicative of how often the same diagnostic condition (or other result) was found to be accurate in the same or similar vehicles under the same or similar circumstances in the past and/or the degree of similarity between the vehicle/data acquired and the vehicle/data reflected in the historical data. The method may proceed if the reliability score is above a prescribed threshold, or alternatively, the method may cease or start over if the reliability score is below the prescribed threshold. In this regard, if the confidence in the identified possible fault is low at the outset, further diagnostic analysis reliant on that possible fault may have little value. However, the system may be configured to override a low reliability score if the same fault condition is determined on multiple occasions (e.g., when the method starts over and continues to arrive at the same possible fault condition).

Once the possible fault condition is identified, a drive cycle associated with the possible fault condition may also be identified to confirm a tentative diagnosis, or to conform that a condition has be rectified. In this regard, a database of possible fault conditions matched with one or more drive cycles may be referenced to identify an appropriate drive cycle. The database may be located on the memory circuit of the DAT 12, on a smartphone in communication with the DAT 12, on the vehicle, or on a remote computer, such as a remote server. The identification of the drive cycle may be identified autonomously (i.e., without requiring any user input) in response to identification of a possible fault condition.

The DAT 12 may include a display 18 useful for displaying the drive cycle procedure. It is also contemplated that the drive cycle procedure may be displayed on a display remote from the DAT 12, such as the user's smartphone 19 or the central display screen on the vehicle's infotainment center. In this regard, the DAT 12 or an associated server may send the drive cycle procedure to the smartphone 19 or vehicle infotainment system for depiction on the remote display. Vehicle data may be analyzed during the drive cycle to validate the possible fault condition. For instance, if a particular system or component is associated with the possible fault condition, the vehicle data received during the drive cycle and associated with that particular system or component may deviate from what is expected from a healthy system or component. The analysis of vehicle data to validate the possible fault condition may occur autonomously in response to receipt of the vehicle data. Furthermore, the analysis of vehicle data may occur independent of user input, such that the analysis may be conducted on the DAT 12 or on a remote device, such as the driver's smartphone or via a remote server. In this regard, the driver can remain focused on the road, while the hardware and software associated with the diagnostic system may perform the analysis of the data generated during the drive cycle so as not to distract the driver's attention away from the road.

Using the DAT 12, OBD2 livedata PIDS may be checked to ensure the drive cycle has been completed. If the drive cycle has been completed, the process may continue. On the other hand, if the drive cycle has been interrupted, or has otherwise not been completed, the method may be suspended and autonomously resumed when the interruption ends until the DAT 12 can confirm that the drive cycle has been completed. For more information about performing a drive cycle procedure, please refer to U.S. Pat. No. 11,113,902 entitled ON BOARD DIAGNOSTICS DRIVE CYCLE ADVISOR, owned by Innova Electronics Corporation, and the contents of which are expressly incorporated herein by reference.

Once it is confirmed that the drive cycle has been completed, the DAT 12 may communicate with the vehicle using service $01, PID 41, to check all monitors on the vehicle, including identification of any abnormal monitors in the OBD2 data. Abnormal monitors may include incomplete monitors or disabled monitors. On a spark ignition vehicle (e.g., gas), the monitors may include, but are not necessarily limited to Misfire Monitor, Fuel System Monitor, Comprehensive Component Monitor, Catalyst Monitor, Heated Catalyst Monitor, EVAP System Monitor, Secondary Air System Monitor, Air Conditioning (A/C) Monitor, Oxygen Sensor Monitor, Oxygen Sensor Heater Monitor, Catalyst Monitor, and Exhaust Gas Recirculation Valve (EGR) System Monitor. On compression ignition vehicles (e.g., diesel), the monitors may include, but are not necessarily limited to Misfire Monitor, Fuel System Monitor, Comprehensive Component Monitor, Non-Methan Hydrocarbon Catalyst (NMHC) Monitor, NOx/SCR (Nitrogen Oxide/Selective Catalytic Reduction) Aftertreatment Monitor, Boost Pressure, Exhaust Gas Sensor, PM (Particulate) Filter Monitor, EGR Monitor and/or Variable Valve Timing (VVT) System Monitor.

If there are no abnormal signals from the monitors/sensors, the test may be associated with a passing assessment and other conditions may be considered for further troubleshooting, such as checking for obvious mechanical signs, checking connectors for corrosion, frayed wiring, and damaged pins, and paying attention to any intermittent problems. These conditions may be displayed on the DAT 12, or on a display associated with the DAT 12 or the user, such as on the user's smartphone or computer. A database of possible troubleshooting procedures may provide a ranked listing of troubleshooting possibilities. In accordance with the present disclosure, the ranked listing may be vehicle-specific as well as being location-specific. Similarly, the reliability score may be adjusted based on correspondence of the location of the vehicle under test and the location associated with the vehicles from which the historical data is derived. For instance, vehicles driven in cold climates and exposed to salted roads in wintery conditions may be more prone to experience certain problems than vehicles driven in warm, dry climates. Furthermore, vehicles driven at higher altitudes may experience certain problems that may not be likely in vehicles driven at, or near sea-level.

It is also contemplated that if there are no abnormal signals from the monitors/sensors, all data, monitored conditions, and test results gathered and observed to this point in the process, including vehicle identification information, may be fed into a machine learning model to derive a reliability score, possible troubleshooting options, and/or a ranking listing of troubleshooting possibilities. Further, the user may also be able to input symptomatic information into the machine learning model such that the symptomatic information may be used in the analysis. The symptomatic information may be entered directly into the DAT 12, or alternatively, into a computer or smartphone 18 in communication with the DAT 12, wherein the app. on the smartphone 18 configures the smartphone 18 to facilitate user entry of the symptomatic information, and then forwarding of the entered symptomatic information for use in the analysis.

Referring now specifically to FIG. 1B, if there are abnormal signals from the monitors/sensors, the DAT 12 may use Mode $09, PID 08 and PID OB to check for abnormal values in In-Use Monitor Performance Ratio (IUMPR). IUMPR is a useful data metric for determining the operational frequency of different monitoring strategies under specific drive cycle conditions. IUMPR typically accomplishes this by maintaining two counters: a first counter (e.g., the Conditions Item) that measures the number of times that all conditions necessary for a specific monitor to detect a malfunction have been encountered, and a second counter (e.g., the Completion Item) that measures the number of times that the vehicle has been operated under the specific conditions for the monitor. In other words, IUMPR may refer to the number of monitoring events/number of driving events. The numerator of the ratio corresponds to the first counter, while the denominator represents the second counter. This enables the calculation of the IUMPR for the specific monitor. The implementation of Mode $09, PID 08 and/or PID OB, and/or calculation of IUMPR may proceed autonomously in response to specified conditions, such as the receipt of abnormal signals from the monitors/sensors, which may be informed by machine learning To ensure accuracy, the collected IUMPR ratio data may be subject to minimum frequencies that vary based on the engine's model year and other factors, which may also be informed by machine learning. These minimum frequencies help document whether or not particular monitoring strategies have successfully assessed the performance of components/systems since the vehicle's OBD system memory was last cleared. This recorded data, known as "readiness indicators," may play a crucial role in vehicle inspection and maintenance programs. The IUMPR can be used to autonomously detect a failed Electronic Control Units (ECU) program or tune-up ECU by monitoring abnormality in incrementing of the counter.

The DAT 12 may be configured to detect any abnormal value in the Conditions Item and the Completion Item of the IUMPR data. An abnormal value may be an unexpected value or a value that deviates from an expected value by a prescribed amount (e.g., deviation of 10%, 20%, etc.). According to one embodiment, the abnormal value may be based on values/ranges set by the OEM for that monitor, component or system. Furthermore, the abnormal value/ranges may be set by the technician or the company conducting the diagnostics. The abnormal value may also be based on historical Conditions Item values and Completion Item values that were determined to be abnormal in similar vehicles. This determination may be made based on the professional experience of the mechanic, or based on symptoms of the vehicle that were believed to be correlated to an abnormal value in the Conditions Item and/or the Completion Item. It is also contemplated that the abnormal value may be determined by machine learning/artificial intelligence module, which can learn normal values and abnormal values based on data fed into the machine learning/artificial intelligence resource. For instance, vehicle data associated with normal values, as may be determined by an OEM, mechanic, etc., as well as vehicle data associated with abnormal values may be fed into a machine learning module to enable the machine learning module to allow the machine learning module to learn how and when to identify normal values and abnormal values from data retrievable from the vehicle.

If the Conditions Item and the Completion Item values related to the disabled monitor are abnormal, that could be an indication of a problem with the ECU, which may require reprogramming of the ECU to a latest version. In this regard, certain embodiments of the DAT 12 may be capable of autonomously initiating a request for a software update for the ECU. This may entail sending a signal to the ECU to implement preprogrammed software update procedures, or facilitating the download of the software update using other communication resources, such as the user's smartphone or tablet computer. On the other hand, if the Conditions Item and Completion Item values related to the disabled monitor are normal, there could be problems with the component and system.

The monitors that may be supported in Mode $09, PID 08-IUMPR may include, but is not necessarily limited to, OBD Monitoring Conditions Encountered Counts, Ignition Counter, Catalyst Monitor Completion Counts Bank 1, Catalyst Monitor Conditions Encountered Counts Bank 1, Catalyst Monitor Completion Counts Bank 2, Catalyst Monitor Conditions Encountered Counts Bank 2, O2 Sensor Monitor Completion Counts Bank 1, O2 Sensor Monitor Conditions Encountered Counts Bank 1, O2 Sensor Monitor Completion Counts Bank 2, O2 Sensor Monitor Conditions Encountered Counts Bank 2, EGR Monitor Completion Condition Counts, EGR Monitor Conditions Encountered Counts, AIR Monitor Completion Condition Counts (Secondary Air), AIR Monitor Conditions Encountered Counts (Secondary Air), EVAP Monitor Completion Condition Counts, and EVAP Monitor Conditions Encountered Counts.

If there do not appear to be any abnormal IUMPR items, the DAT 12 may autonomously use Mode $06 to check for fail monitor ID (OBDMID) and Test ID (TID). OBDMID may refer to what is being tested, while the TID may refer to what specific test is being run. Mode $06 may allow access to the results of on-board diagnostic monitoring tests of vehicle systems or components. These systems or components can be either continuously monitored (e.g., misfire monitoring) or non-continuously monitored (e.g., catalyst system). Continuous monitors may run all the time while the non-continuous monitors may run only after certain conditions are met. By checking Mode $06, the DAT 12 can detect the status of test values of each component or system (OBDMID and the TID). If the DAT 12 detects any fail in test result, the issue could be the component or sensor under test. The components and systems that can be tested in Mode $06 may include, but are not limited to Exhaust Gas Sensor Monitor, Catalyst Monitor, EGR Monitor, VVT Monitor, EVAP Monitor, Exhaust Gas Sensor Heater Monitor, Heated Catalyst Monitor, Secondary Air Monitor, Fuel System Monitor, Boost Pressure Control Monitor, NOx Adsorber Monitor, NOx/SCR Catalyst Monitor, Misfire Cylinder Data, and PM Filter Monitor.

The Mode $06 function may enable monitoring, which may allow for autonomous detection of degrading performance of the component to predict the faults that may be occurring with the vehicle, or it can be used as a factor to detect the vehicle heath. In this regard, analysis of the data accessible via Mode $06 may allow for identification of diagnostic trends for the monitored component, which may be implemented through machine learning resources. Based on the information available via Mode $06, the component and/or system that may be faulty may be autonomously verified and displayed or otherwise communicated to the user. This may help the user focus on a certain component(s) and/or system(s) to check. In some cases, the vehicle may be experiencing symptoms such as lost power, or excessive fuel consumption, and the Readiness Monitors may not be completed, despite the driver driving the vehicle in accordance with the drive cycle needed to complete the readiness monitors. Furthermore, there may not be any DTCs that are generated to obtain any insight into a problematic component or system. In that instance, Mode $06 may be used to detect a faulty or degrading component or system.

It is contemplated that any diagnostic trend-type data gathered during the process, such as the Mode $06 data as described above, may be useful as an input to a machine learning model. In this regard, the machine learning model may be capable of identifying a possibly faulty system or component based on the trends embodied in the data, in combination with other data and information that may be available.

When retrieving information in Mode $06, the DAT 12 may detect the test value of each OBDMID and the TID. The DAT 12 may also lookup in a database to obtain a translation of each OBDMID and TID that may be understandable by the user. If the DAT 12 detects any fail in test result, the issue could be the component or sensor associated with the test, and the DAT 12 may display the failure OBDMID and TID with the test value and status to the user.

Figure 7:
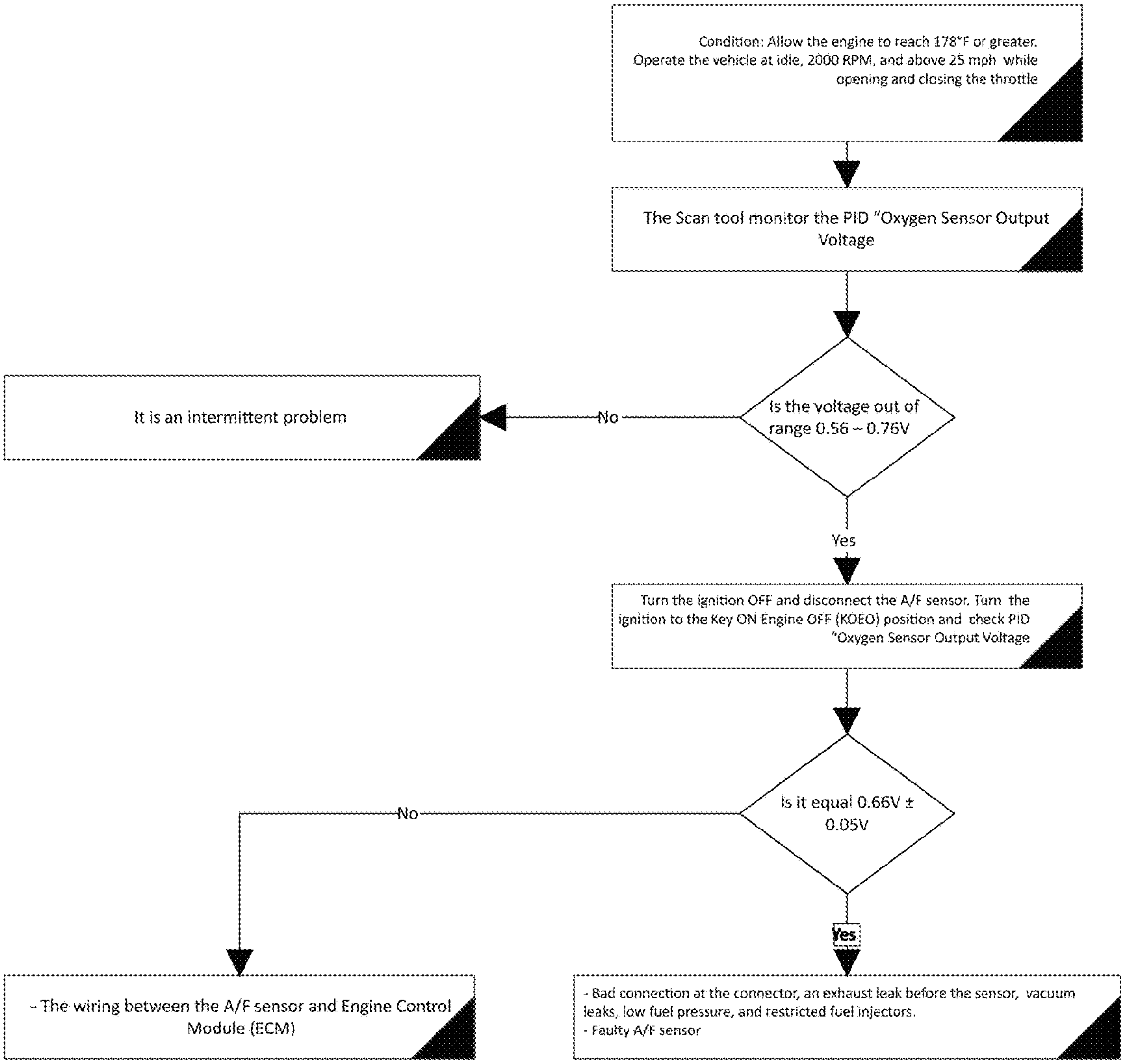
FIG. 7 is a flow chart of an exemplary methodology associated with implementing a special function test.

In the event of a detected fail, the DAT 12 may autonomously prompt the user to initiate an OBD2 Special Test to test the component, as indicated in FIG. 1C. The OBD2 Special Test uses the OBD2 PIDs live data to monitor the operation of the component while the vehicle is operating and it compares the actual value with the specification value. In this regard, the Special Test allows for detecting the status of the component. For instance, FIG. 7 is a flow chart associated with a Special Test to check the Air Fuel Ratio Sensor (A/F sensor) status. In some embodiments, the DAT 12 can be configured to autonomously initiate the OBD Special Test in response to a detected fail.

Exemplary Special Tests include, but are not limited to, Long Term Fuel Trim Test, MAF Sensor Test, MAP Sensor Test, Catalytic Efficiency Test, EVAP Test, and EGR Test.

If the DAT 12 detects that all the test results are passing, the DAT 12 may generate a display to inform the user to check the conditions such as engine coolant temperature, ambient air temperature, barometric pressure that may not meet the condition for the test, or the monitor may have exceeded the maximum test attempts.

If there is no fail, the condition of operation is not correct, and thus, the vehicle may need to be driven in the required conditions and checked again. In other words, the component may work well after the evaluation process, however, the monitor of the component may still not be completed. Common examples of when this may occur include an engine-off soak being not long enough (e.g., cold start temperature conditions not satisfied), monitor maximum time limit or number of attempts/aborts exceeded, ambient air temperature too low or too high; pressure too low (high altitude), monitor disabled due to sensor failure.

If there is a fail, then the DAT 12 may detect the component or system that has failed. In this regard, the data from the vehicle may include parameter values for a suspected faulty component. The received parameter values and expected parameter values may be displayed and compared to each other.

After the test, the ECU may respond to the DAT 12 with the status of the component or system. The operational status of the component may be observed and any received value of component parameters may be compared with an expected value. If the received value does not conform with the expected value, a conclusion may be made that the component is faulty. If the received value does conform with the expected value, a conclusion may be made that the component is not faulty.

Furthermore, the component or system can be inspected more efficiently when the DAT 12 can detect the vehicle information and have the database of (Original Equipment Manufacturer) OEM Active Test and Special Function. The DAT 12 can inspect the component deeply and have more live data to compare to detect the faulty component or system.

Example

The vehicle: 2015 Honda Fit L4, 1.5 L

Status: The Monitors: Oxygen sensor monitoring, and Oxygen sensor heater monitoring have status of Incomplete Follow the Drive Cycle to drive the vehicles:

1. Turn the ignition switch ON; do not start the engine. The MIL will come on for 15-20 seconds. If it goes OFF, readiness codes are Complete. If it blinks several times, one or more readiness codes are Incomplete.

2. Connect a scan tool to the data link connector and select generic mode.
3. Start engine.
4. Drive under stop and go conditions with short periods of steady cruises. During the drive, decelerate with throttle fully closed, for 5 seconds.
5. The readiness code should switch to complete in about 3.5 miles.
6. If the readiness code is still Incomplete, check for a temporary DTC.
7. If no DTC is present, one or more of the enabling criteria were probably not met. If the ECT (Engine Coolant Temperature) is lower than 140 degrees F., run the engine until the ECT (Engine Coolant Temperature) exceeds 140 degrees F., and repeat the test.

After completing the Drive Cycle but there are some monitors that cannot be completed, Monitor status in This Drive Cycle:

| Monitors | Status |
| --- | --- |
| Misfire monitoring | Complete |
| Fuel system monitoring | Complete |
| Comprehensive component monitoring | Complete |
| Oxygen sensor monitoring | Disable |
| Oxygen sensor heater monitoring | Disable |
| EGR system monitoring | Complete |

Access Mode $09 PID 08 to check and monitor the IUMR while driving the vehicle with many ignition key ON/OFF Cycles: All the monitor work normally, the value of counter and complete increase normally. It means that the ECU works normally. See FIG. 8.

Access Mode $06 to check the status of MID and Test ID, we found there is a failure in result of test of the component: Check of A/F sensor 'non-activation' by monitoring the sensor element resistance during A/F feedback control. See FIG. 9.

Figure 10:
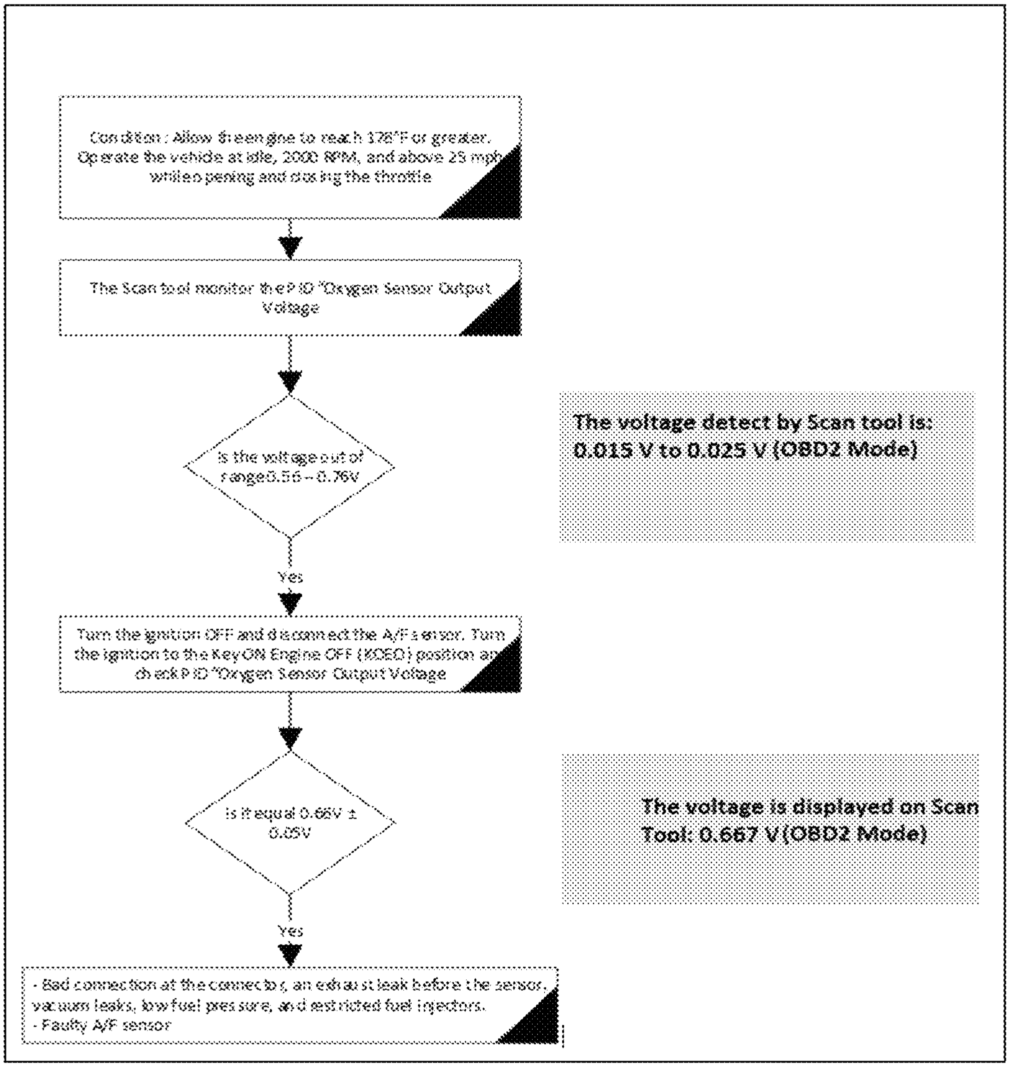

Using the OBD2 Special Test to check the A/F sensor. See FIG. 10.

As the result, the Scan Tool shows that the A/S Sensor is faulty.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An automotive diagnostic method aimed at focusing diagnostic data retrieval and analysis on a possible fault condition, the method comprising the steps of:

receiving vehicle data from a vehicle at a data acquisition and transfer device (DAT);

analyzing the vehicle data at the DAT to identify the possible fault condition;

identifying a drive cycle associated with the possible fault condition;

monitoring driving conditions with the DAT to identify completion of the identified drive cycle;

upon the completion of the identified drive cycle, analyzing the vehicle data to identify an abnormal monitor; and analyzing the vehicle data to identify an abnormal value of In-Use Monitor Performance Ratio (IUMPR) associated with the abnormal monitor, including determining a numerator that represents a number of times all monitoring conditions necessary for a specific monitor to detect a malfunction have been encountered, determining a denominator that represents a number of times the vehicle has been operated under defined conditions for a standard drive cycle, calculating a ratio of the numerator to the denominator, and comparing the ratio to a threshold;

when the abnormal value of IUMPR is identified, identifying a likely diagnostic condition associated with the identified abnormal value of IUMPR;

when a normal value of IUMPR is identified, further comprising the step of retrieving Mode $06 data;

reviewing, by the DAT, the Mode $06 data for an abnormal test result and identifying a component associated with the abnormal test result;

issuing an electronic OBD-II control command to initiate a Special Test for the identified component;

generating a wireless message to a remote electronic device including at least a vehicle identification number (VIN), a monitor ID, a test ID, an IUMPR ratio value, and timestamps for the completion of the identified drive cycle and execution of the Special Test;

wherein the DAT: (i) identifies the completion of the identified drive cycle by querying a vehicle electronic control unit (ECU) using OBD-II service $01, PID $41 to read monitor readiness status; and (ii) computes the IUMPR by querying OBD-II service $09, PID $08 and/or PID SOB to obtain conditions and completion counters and performing the ratio and threshold comparison locally at the DAT;

wherein all steps following the receipt of the vehicle data occur autonomously in response to the receipt of the vehicle data; and wherein all steps following the completion of the identified drive cycle occur autonomously in response to the completion of the identified drive cycle.

2. The method recited in claim 1, wherein the step of analyzing the vehicle data to identify the possible fault condition is based on an analysis of at least one diagnostic trouble code (DTC) included in the received vehicle data.

3. The method recited in claim 1, wherein the step of analyzing the vehicle data to identify the possible fault condition is based on an analysis of live data included in the received vehicle data.

4. The method recited in claim 1, wherein the step of analyzing the vehicle data to identify the abnormal value of IUMPR includes analyzing a conditions item portion of IUMPR.

5. The method recited in claim 1, wherein the step of analyzing the vehicle data includes using a machine learning model, wherein the vehicle data is entered into the machine learning model to produce the possible fault condition.

6. The method recited in claim 1, wherein the step of analyzing the vehicle data to identify the abnormal value of IUMPR includes analyzing a completion item portion of IUMPR.

7. The method recited in claim 1, further comprising the step of analyzing the received vehicle data to identify at least one of the monitor ID and the test ID when no abnormal IUMPR is identified.

8. The method recited in claim 1, further comprising the step of the DAT or a remote server generating a signal for wireless communication to the remote electronic device, the signal including the identified likely diagnostic condition.

9. The method recited in claim 1, further comprising the step of assigning a reliability score to the possible fault condition.

10. The method recited in claim 9, wherein the steps of identifying the drive cycle and monitoring the driving conditions only occur if the reliability score is above a prescribed threshold.

11. The method recited in claim 9, wherein the step of assigning the reliability score is based on a comparison of the received vehicle data to historical vehicle data for similar vehicles.

12. The method recited in claim 11, further comprising the step of adjusting the reliability score based on a degree of similarity between the vehicle and a historical vehicle from which the historical vehicle data is derived.

13. The method recited in claim 11, further comprising the step of adjusting the reliability score based on a degree of similarity between the vehicle data and the historical vehicle data.

14. The method recited in claim 1, wherein the analyzing the vehicle data to identify the possible fault condition includes evaluating both diagnostic trouble code (DTC) data and live vehicle data.

15. The method recited in claim 1, wherein the electronic OBD-II control command is issued by the DAT.

16. An automotive diagnostic method aimed at focusing diagnostic data retrieval and analysis on a possible fault condition, the method comprising the steps of:
- receiving vehicle data from a vehicle using a data acquisition and transfer device (DAT);
- identifying a drive cycle associated with the possible fault condition;
- monitoring driving conditions using the DAT to identify completion of the identified drive cycle;
- upon the completion of the identified drive cycle, analyzing the vehicle data on the DAT to identify an abnormal monitor; and
- analyzing the vehicle data to identify an In-Use Monitor Performance Ratio (IUMPR) associated with the abnormal monitor, including calculating an IUMPR ratio and comparing the IUMPR ratio to a predetermined threshold;
- when an abnormal value of IUMPR is identified, identifying a likely diagnostic condition associated with the identified abnormal value of IUMPR;
- when a normal value of IUMPR is identified, further comprising the step of retrieving Mode $06 data;
- reviewing, by the DAT, the Mode $06 data for an abnormal test result and identifying a component associated with the abnormal test result;
- issuing an electronic OBD-II control command to initiate a Special Test for the identified component;
- generating a wireless message to a remote electronic device including at least a vehicle identification number (VIN), a monitor ID, a test ID, an IUMPR ratio value, and timestamps for the completion of the identified drive cycle and execution of the Special Test;
- wherein the DAT: (i) identifies the completion of the identified drive cycle by querying a vehicle electronic control unit (ECU) using OBD-II service $01, PID $41 to read monitor readiness status; and (ii) computes the IUMPR by querying OBD-II service $09, PID $08 and/or PID $0B to obtain conditions and completion counters and performing the ratio and threshold comparison locally at the DAT;
- wherein all steps following the receipt of the vehicle data occur autonomously in response to the receipt of the vehicle data; and
- wherein all steps following the completion of the identified drive cycle occur autonomously in response to the completion of the identified drive cycle.

17. The method recited in claim 16, further comprising the step of assigning a reliability score to the possible fault condition.

18. The method recited in claim 17, wherein the steps of identifying the drive cycle and monitoring the driving conditions only occur if the reliability score is above a prescribed threshold.

19. The method recited in claim 16, wherein the DAT used to receive the vehicle data includes interface circuitry configured to communicate with the ECU.

20. The method recited in claim 16, wherein the possible fault condition is identified by the DAT based on at least one of diagnostic trouble code (DTC) data and live vehicle data.

21. The method recited in claim 16, wherein the electronic OBD-II control command is issued by the DAT.

22. A data acquisition and transfer device (DAT) for automotive diagnostics, the DAT comprising interface circuitry configured to communicate with a vehicle electronic control unit (ECU), a processor, and non-transitory memory storing instructions that, when executed by the processor, cause the DAT to:
- receive vehicle data from the ECU;
- analyze the vehicle data to identify a possible fault condition, including at least one of: evaluating diagnostic trouble code (DTC) data and evaluating live vehicle data;
- monitor driving conditions to detect completion of an identified drive cycle associated with the possible fault condition, including querying OBD-II service $01, PID $41 to read monitor readiness status;
- upon the completion of the identified drive cycle, analyze the vehicle data to detect an abnormal monitor;
- compute, locally at the DAT, an In-Use Monitor Performance Ratio (IUMPR) for the abnormal monitor by determining a numerator that represents a number of times all monitoring conditions necessary for the monitor to detect a malfunction have been encountered, determining a denominator that represents a number of times a vehicle has been operated under defined conditions for a standard drive cycle, calculating a ratio of the numerator to the denominator, and comparing the ratio to a threshold, including querying OBD-II service $09, PID $08 and/or PID $0B to obtain IUMPR counters;
- when the IUMPR is normal, retrieve Mode $06 data, identify at least one of an OBD on-board diagnostic monitor identifier (OBDMID) and a test identifier (TID), and identify a component associated with an abnormal Mode $06 test result; and
- issue an electronic OBD-II control command to initiate a Special Test for the identified component, wherein actions following receipt of the vehicle data occur autonomously in response to the receipt of the vehicle data, and actions following the completion of the identified drive cycle occur autonomously in response to the completion of the identified drive cycle, and wherein the DAT is further configured to generate a wireless message to a remote electronic device including at least a vehicle identification number (VIN), a monitor ID, a test ID, an IUMPR ratio value, and timestamps for the completion of the identified drive cycle and execution of the Special Test.

* * * * *